Patented July 25, 1950

2,516,162

UNITED STATES PATENT OFFICE 2,516,162

POLYMERIC MATERIALS

Charles William Tullock, Wilmington, Del., assignor to E. I. du Pont de Nemours & Company, Wilmington, Del., a corporation of Delaware No Drawing. Application October 7, 1947, Serial No. 778,455

15 Claims. (Cl. 260—33.8)

This invention relates to synthetic linear copolyamides, and more particularly to new and useful fluid and plasticized compositions comprising these copolyamides.

It has been reported by Curtius, J. prakt. chem. 125, 211–302 (1930), that the polyamides from the N-carboanhydrides of leucine and valine are soluble in benzene and that the polyamide from the N-carboanhydride of alpha-aminoisoamylacetic acid is soluble in hot benzene. Curtius further reports the solubility of the polyamide from the N-carboanhydride of m-tolylalanine in hot ethyl acetate and hot acetone; in both cases the polymer precipitates upon cooling. Curtius also reports the solubility of the polyamide from the N-carboanhydride of leucine in warm acetic acid and of the polyamide from the N-carboanhydride of valine in warm concentrated hydrochloric acid. Wessely and Sigmund, Z. physiol. chem. 159, 102–119 (1926), report the solubility of the polyamide from the N-carboanhydride of sarcosine (N-methylglycine) in water, ethanol, and with great difficulty in chloroform, phenol, and acetic acid. Woodward and Schramm, J. A. C. S. 60, 1551 (1947), report that benzene is a solvent for the copolyamide from the N-carboanhydrides of DL-beta-phenylalanine and L-leucine, giving extremely viscous solution (intrinsic viscosity of approximately 10).

This invention has as an object new and useful compositions comprising synthetic linear polyamides. A further object is the production from this type of polymer of valuable fluid compositions useful in the manufacture of films, fibers, coatings, and the like. A still further object is the preparation of plasticized compositions comprising synthetic linear polyamides. Other objects will appear hereinafter.

The above objects are accomplished by the preparation of liquid and plasticized compositions from halogenated hydrocarbons and the copolyamides such as are obtained by the polymerization with carbon dioxide evolution, of mixtures of two or more N-carboanhydrides of amino acids containing at most one hydrogen on the alpha carbon atom. Preferred for reasons of ease in synthesis of the starting materials are the copolyamides resulting from the N-carboanhydrides of primary alpha-amino acids. The term "alpha-amino acids" is used in accordance with its usual meaning as designating those amino acids having an amino group on the alpha carbon atom. The "alpha carbon atom" refers to the carbon atom of the acid to which the carboxyl group is attached.

In the preferred practice of the invention solutions of these copolyamides are obtained by means of liquid halogented hydrocarbons boiling below 250° C. These liquid halogenated hydrocarbons yield compositions which are quite fluid, are easy to handle, and which are of particular utility in making films and fibers. Further the improved fluidity thus obtained, as compared with that obtained by means of hydrocarbon solvents such as benzene, makes possible the production of solutions which have higher solids concentration, e. g., 1 to 15% by volume, for any given copolyamide, but which have the same viscosity as the solution in hydrocarbon solvent.

When plasticized compositions are desired these can be obtained by means of the higher boiling liquid and solid halogenated hydrocarbons, namely, those boiling above 250° C.

These halogenated hydrocarbons when incorporated with the copolyamide in small amounts, that is from about 1% to 50% by weight of the copolyamide, are softeners or plasticizers for the copolyamide.

The following examples, in which the parts given are by weight, further illustrate the practice of this invention.

Example I

One part of the copolyamide from a 1:1 by weight mixture of the N-carboanhydrides of L-leucine and DL-beta-phenylalanine was added to 147.4 parts of chloroform and the mixture (containing 1% of the copolyamide by volume) allowed to stand at room temperature. A clear, homogeneous solution was obtained. A thin layer of this solution was flowed onto a glass plate. Upon evaporation of the chloroform there was obtained a clear, attractive, self-supporting film.

The copolyamide mentioned in the above example is soluble in other halogenated hydrocarbons as is shown by the following table which summarizes the results obtained by applying the procedure in the example to a number of different halogenated hydrocarbons.

| Parts by Weight of Copolyamide | Percent By Volume | Parts by Weight of Solvent |
|---|---|---|
| 17 | 23.5 | 83 Chloroform. |
| 10 | 14.2 | 90 Chloroform. |
| 5 | 7.3 | 95 Chloroform. |
| 1.0 | 0.99 | 108.9 Benzyl chloride. |
| 1.0 | 0.99 | 132.3 Methylene chloride. |
| 1.0 | 0.99 | 145.1 Trichloroethylene. |
| 1.0 | 0.99 | 109.6 Chlorobenzene. |
| 1.0 | 0.99 | 162.9 Tetrachloroethylene. |
| 1.0 | 0.99 | 183.0 Allyl Iodide. |
| 1.0 | 0.99 | 86.9 n-Amyl chloride. |
| 1.0 | 0.99 | 124.3 1,2-Dichloroethane. |
| 1.0 | 0.99 | 99.0 1,2-Dichloroethane. |
| 1.0 | 0.99 | 157.9 Carbon tetrachloride. |
| 1.0 | 1.6 | 99.0 Carbon tetrachloride. |

All the compositions indicated in the above table except the first, which was non-flowable but homogeneous, were flowable solutions which are clear and homogeneous at room temperature. These solutions gave clear, attractive, self-supporting films upon evaporation of the solvent from a thin layer of the solution flowed on a glass plate. While in some instances, as in the last five items in the table, a few undissolved particles remain when the polymer is dissolved at room temperature, complete solution is readily obtained by heating and the solution remains clear and homogeneous upon cooling to room temperature. In the best practice of this invention the solutions of the copolyamide in the halogenated hydrocarbon contain from 0.5% to 10% of the copolyamide.

*Example II*

One part of the copolyamide from a 1:1 by weight mixture of the N-carboanhydrides of DL-beta-phenylalanine and 1-aminocyclohexanecarboxylic acid was added to 147.4 parts of chloroform, and the mixture (1% of the copolyamide by volume) allowed to stand at room temperature. A clear, homogeneous solution resulted. A thin layer of this solution was flowed onto a glass plate. Upon evaporation of the chloroform there was obtained a clear, attractive, self-supporting film. This polymer is not soluble in benzene.

*Example III*

One part of the copolyamide from a 1:1:1 by weight mixture of the N-carboanhydrides of DL-beta-phenylalanine, 1-aminocyclohexanecarboxylic acid, and alpha-aminoisobutyric acid was added to 296.3 parts of chloroform and the mixture (0.67% of the copolyamide by volume) warmed on a steam bath. A clear, homogeneous solution resulted which remained thus upon cooling to room temperature, with no evidence of precipitation of polymer. A thin layer of the solution was flowed onto a glass plate. Upon evaporation of the chloroform there was obtained a clear, attractive, self-supporting film.

*Example IV*

One part of the copolyamide from a 1:2 by weight mixture of the N-carboanhydrides of 1-aminocyclohexanecarboxylic acid and alpha-aminoisobutyric acid was added to 296.3 parts of chloroform and the mixture (0.67% of the copolyamide by volume) warmed on a steam bath. A clear, homogeneous solution resulted which remained thus upon cooling to room temperature, with no evidence of precipitation of polymer. A thin layer of the solution was flowed onto a glass plate. Upon evaporation of the chloroform there was obtained a clear, attractive, self-supporting film. The copolyamide was insoluble in boiling benzene.

*Example V*

One part of the copolyamide from a 1:1 by weight mixture of the N-carboanhydrides of DL, DD, LL, LD-2-amino-4,6,6-trimethylheptanoic acid and 1-aminocyclohexanecarboxylic acid was added to 296.3 parts of chloroform and the mixture (0.67% of the copolyamide by volume) warmed on a steam bath. A clear, homogeneous solution resulted, which remained thus upon cooling to room temperature with no evidence of precipitation of the polymer. A thin layer of the solution was flowed onto a glass plate. Upon evaporation of the chloroform there was obtained a clear film.

The same results were obtained when one part of this copolyamide was placed in 9 parts of chloroform (the solution containing 14.2% by volume of the polymer) and allowed to stand at room temperature.

*Example VI*

One part of the copolyamide from a 1:1 by weight mixture of the N-carboanhydrides of L-leucine and DL, DD, LL, LD-2-amino-4,6,6-trimethylheptanoic acid was added to 21 parts of chloroform and the composition (containing 6.6% of the polymer by volume) allowed to stand overnight. A clear, homogeneous solution which did not flow at 65° C. was obtained.

When one part of this copolyamide was added to 81 parts of chloroform and the mixture (containing 1.8% of the polymer by volume) allowed to stand overnight, a clear, homogeneous solution was obtained which flowed at room temperature. A thin layer of this solution was flowed onto a glass plate. Upon evaporation of the chloroform there was obtained a clear, attractive, strong, self-supporting film.

The solvents most advantageously used in the practice of this invention are halogenated hydrocarbons of 1 to 8 carbons which are normally liquid (i. e., liquid at 25° C.). The halogen is generally chlorine although bromides and iodides can be used. Of these halogenated hydrocarbons, particularly useful are the halogenated aliphatics of 1-6 carbons. The halogenated hydrocarbons can, if desired, be used in conjunction with a minor amount of a phenol.

As solvents, other than those given in the examples, operable in this invention, there may be mentioned: alkenyl halides such as methallyl chloride and 1,4-dichloro-2-butene; alkyl halides such as butyl chloride and tertiary amyl chloride; cycloalkyl halides such as cyclohexyl chloride and cyclopentyl chloride; halogenated aromatic hydrocarbons such as m-bromotoluene and 2,4-dichlorotoluene; halogenated aralkyl hydrocarbons such as benzal chloride, benzotrichloride, and p-chlorobenzyl chloride; and polyhalogenated non-benzenoid hydrocarbons such as 1,2,3-trichloropropane.

Solutions of the halogenated hydrocarbons of this invention and synthetic linear copolyamides can be prepared at a given solids concentration in less time if the synthetic linear copolyamide is finely divided and/or the resulting mixture of synthetic linear copolyamide and halogenated hydrocarbon of this invention is heated.

In the plasticized compositions the halogenated hydrocarbon, which as mentioned previously has a boiling point above 250° C. at atmospheric pressure, is used in amount of from 1% to 50% by weight of the synthetic linear copolyamide. A convenient method of incorporating these halogenated hydrocarbons into the synthetic linear copolyamides to obtain a plasticized composition is to soak the synthetic linear copolyamide in the halogenated hydrocarbon, or to soak the linear copolyamide in a solution of the halogenated hydrocarbon in a solvent for said halogenated hydrocarbon which is a non-solvent for the synthetic linear copolyamide, and subsequently to dry the impregnated synthetic linear copolyamide.

Examples of suitable halogenated hydrocarbons boiling above 250° C. at atmospheric pressure, which are useful in the processes previously described for the production of plasticized compositions of synthetic linear copolyamides, comprise the following compounds: a polychlorinated diphenyl (known to the trade as "Arochlor"), tetrachloroamylbenzene, pentachloroamylbenzene, hexachlorobenzene, tetrabromobenzene, pentabromobenzene, hexabromobenzene, pentachlorodiphenyl, hexachlorodiphenyl, octachlorodiphenyl, polychlorinated naphthalene, polychlorinated anthracene, polychlorinated diphenyl ether, polychlorinated benzylphenyl ether, polychlorinated alkyl benzenes, and halogenated sulfonamides such as chlorocetanesulfonamide.

The present invention, as has been noted previously, is of particular utility in the manufacture of low viscosity highly fluid compositions comprising the copolyamides and halogenated hydrocarbons boiling below 250° C. This improved fluidity is well shown by the following comparative data: A 2% solution of the copolyamide from a 1:1 by weight mixture of the N-carboanhydrides of L-leucine and DL-beta-phenylalanine in chloroform exhibited a viscosity of approximately 0.1 poise, as determined in a Gardner-Holdt bubble viscometer (the time of bubble travel was 0.5 second), whereas a 2% solution of another sample from the same batch of the same copolyamide in benzene exhibited a viscosity of approximately 3.10 poises when measured in the same fashion (the time of bubble travel was 3.5 seconds).

The present compositions, by reason of their desirable properties referred to herein, find valuable application in the manufacture of films, coatings, and plasticized polymeric compositions.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a solution in a liquid halogenated hydrocarbon of a copolyamide obtained by the condensation polymerization, with carbon dioxide evolution, of a mixture of at least two N-carboanhydrides of alpha amino acids containing at most one hydrogen on the alpha carbon.

2. A composition according to claim 1 wherein the copolyamide is a leucine copolyamide.

3. A composition according to claim 1 wherein the copolyamide is a 2-amino-4,6,6-trimethylheptanoic acid copolyamide.

4. A composition according to claim 1 wherein the copolyamide is a 1-aminocyclohexanecarboxylic acid copolyamide.

5. A composition according to claim 1 wherein the halogenated hydrocarbon is chloroform.

6. A composition according to claim 1 wherein the halogenated hydrocarbon is chlorobenzene.

7. A composition according to claim 1 wherein the halogenated hydrocarbon is trichloroethylene.

8. A composition according to claim 1 wherein the copolyamide is a leucine/beta-phenylalanine copolyamide.

9. A composition according to claim 1 wherein the halogenated hydrocarbon is chlorobenzene and the copolyamide is a leucine/beta-phenylalanine copolyamide.

10. A composition according to claim 1 wherein the halogenated hydrocarbon is trichloroethylene and the copolyamide is a leucine/beta-phenylalanine copolyamide.

11. A composition according to claim 1 wherein the copolyamide is a 2-amino-4,6,6-trimethylheptanoic acid/1 - aminocyclohexanecarboxylic acid copolyamide.

12. A composition according to claim 11 wherein the halogenated hydrocarbon is chloroform.

13. The composition set forth in claim 1 in which said halogenated hydrocarbon contains from 1 to 8 carbon atoms.

14. The composition set forth in claim 13 in which said halogenated hydrocarbon is aliphatic and contains from 1 to 6 carbon atoms.

15. A composition of matter comprising a halogenated hydrocarbon and a copolyamide obtained by the condensation polymerization, with carbon dioxide evolution, of a mixture of at least two N-carboanhydrides of alpha amino acids containing at most one hydrogen on the alpha carbon in which composition of matter the halogenated hydrocarbon when boiling below 250° C. constitutes from 83% to 99.7%, by weight, of the composition and when boiling above 250° C. constitutes from 1% to 50%, by weight, of the composition.

CHARLES WILLIAM TULLOCK.

REFERENCES CITED

The following references are of record in the file of this patent:

UNITED STATES PATENTS

| Number | Name | Date |
|---|---|---|
| 2,149,273 | Carothers | Mar. 7, 1939 |